US010810060B2

(12) United States Patent
Novogran et al.

(10) Patent No.: US 10,810,060 B2
(45) Date of Patent: Oct. 20, 2020

(54) EVENT MANAGEMENT FOR EMBEDDED SYSTEMS

(71) Applicant: SK hynix Inc., Gyeonggi-do (KR)

(72) Inventors: Igor Novogran, Minsk (BY); Dzmitryi Kasitsyn, Minsk (BY); Alexander Ivaniuk, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 76 days.

(21) Appl. No.: 16/172,286

(22) Filed: Oct. 26, 2018

(65) Prior Publication Data

US 2019/0129768 A1 May 2, 2019

Related U.S. Application Data

(60) Provisional application No. 62/577,575, filed on Oct. 26, 2017.

(51) Int. Cl.
*G06F 9/54* (2006.01)
*G06F 11/30* (2006.01)

(52) U.S. Cl.
CPC .......... *G06F 9/542* (2013.01); *G06F 11/3013* (2013.01); *G06F 11/3037* (2013.01); *G06F 2201/81* (2013.01); *G06F 2201/86* (2013.01); *G06F 2201/88* (2013.01)

(58) Field of Classification Search
None
See application file for complete search history.

(56) References Cited

U.S. PATENT DOCUMENTS 9,230,689 B2 1/2016 Tuers et al.
2004/0141580 A1* 7/2004 Maletsky ............. G11C 16/102 377/3
2012/0121060 A1* 5/2012 Melton .................. H03K 21/38 377/44
2013/0145200 A1* 6/2013 Adiga ................... G06F 11/348 713/502
2013/0205076 A1* 8/2013 Schuette ............. G06F 12/0246 711/103
2015/0262714 A1* 9/2015 Tuers .................. G11C 16/349 714/721

(Continued)

OTHER PUBLICATIONS

Cichon et al., Approximate Counters for Flash Memory, Web article, Aug. 2011, p. 1-6, ResearchGate.

*Primary Examiner* — Shih-Wei Kraft
(74) *Attorney, Agent, or Firm* — IP & T Group LLP

(57) ABSTRACT

Methods and instruction sets are provided for performing event management in an embedded system such as a memory system including a memory device and a controller. The controller divides a group of objects, among a plurality of groups of objects, into a plurality of subgroups, each subgroup including a plurality of objects. The controller counts a number of times that each of the objects is affected by external event using an event counter, updates a count value of each of the subcounters each time an object in the corresponding subgroup is affected by the external event, updates a count value of a main counter each time one of the subcounters reaches a count value equal to a first threshold value; and performing system action on the group of objects, when the count value of the main counter is equal to a second threshold value.

13 Claims, 17 Drawing Sheets

(56) References Cited

U.S. PATENT DOCUMENTS

| | | | | |
|---|---|---|---|---|
| 2016/0034206 | A1* | 2/2016 | Ryan | G11C 16/349<br>711/103 |
| 2016/0110249 | A1* | 4/2016 | Orme | G06F 12/0238<br>714/6.24 |
| 2018/0260134 | A1* | 9/2018 | Li | G11C 11/5628 |
| 2018/0374549 | A1* | 12/2018 | Padilla | G11C 16/3427 |

* cited by examiner

Event Counters

|  | P-1 |  | K | K-1 | ... | 2 | 1 | 0 |
|---|---|---|---|---|---|---|---|---|
| $G_0: C_0$ | × | ... | × | $b_{K-1}$ | ... | $b_2$ | $b_1$ | $b_0$ |
| $G_1: C_1$ | × | ... | × | $b_{K-1}$ | ... | $b_2$ | $b_1$ | $b_0$ |
| $G_2: C_2$ | × | ... | × | $b_{K-1}$ | ... | $b_2$ | $b_1$ | $b_0$ |
| ... | | | | | | | | |
| $G_{N-1}: C_{N-1}$ | × | ... | × | $b_{K-1}$ | ... | $b_2$ | $b_1$ | $b_0$ |

EVENT MANAGEMENT FOR EMBEDDED SYSTEMS

CROSS-REFERENCE TO RELATED APPLICATION

This application claims the benefit of U.S. Provisional Application No. 62/577,575, filed Oct. 26, 2017, the entire contents of which are incorporated herein by reference.

BACKGROUND

1. Field

Embodiments of the present disclosure relate to event management for embedded systems.

2. Description of the Related Art

An embedded system is a computer system, which is made from a combination of hardware and software, and is used to perform a specific task. Embedded systems are designed to control a variety of external objects. Examples of embedded systems include printers, cameras, automobiles, cameras, mobile phones, tablet and memory systems.

When the embedded system is system on chip (SoC) for a memory system such as a solid state drive (SSD), the number of controlled objects (e.g., physical blocks) may be very big.

SUMMARY

Aspects of the present invention include embedded systems such as memory systems, methods and instruction sets for managing events in the embedded systems.

In one aspect, a method for operating an embedded system includes: dividing a group of objects, among a plurality of groups of objects, into a plurality of subgroups, each subgroup including a plurality of objects; counting a number of times that each of the objects is affected by external event using an event counter, the event counter including a main counter and a plurality of subcounters respectively corresponding to the plurality of subgroups, the size of each of the subcounters determined based on a first threshold value, the size of the main counter determined based on a second threshold value; updating a count value of each of the subcounters each time an object in the corresponding subgroup is affected by the external event; updating a count value of the main counter each time one of the subcounters reaches a count value equal to the first threshold value; and performing system action on in the group of objects, when the count value of the main counter is equal to the second threshold value.

In another aspect, an embedded system includes a device including a plurality of group objects, and a controller. The controller divides a group of objects, among the plurality of groups of objects, into a plurality of subgroups, each subgroup including a plurality of objects; counts a number of times that each of the objects is affected by external event using an event counter of the controller, the event counter including a main counter and a plurality of subcounters respectively corresponding to the plurality of subgroups, the size of each of the subcounters determined based on a first threshold value, the size of the main counter determined based on a second threshold value; updates a count value of each of the subcounters each time an object in the corresponding subgroup is affected by the external event; updates a count value of the main counter each time one of the subcounters reaches a count value equal to the first threshold value; and performs system action on the group of objects, when the count value of the main counter is equal to the second threshold value.

In still another aspect, a non-transitory computer-readable storage medium stores a set of instructions for a controller to perform operations for managing events of an embedded system. The set of instructions includes instructions for dividing a group of objects, among a plurality of groups of objects, into a plurality of subgroups, each subgroup including a plurality of objects; counting a number of times that each of the objects is affected by external event using an event counter, the event counter including a main counter and a plurality of subcounters respectively corresponding to the plurality of subgroups, the size of each of the subcounters determined based on a first threshold value, the size of the main counter determined based on a second threshold value; updating a count value of each of the subcounters each time an object in the corresponding subgroup is affected by the external event; updating a count value of the main counter each time one of the subcounters reaches a count value equal to the first threshold value; and performing system action on the group of objects, when the count value of the main counter is equal to the second threshold value.

Additional aspects of the present invention will become apparent from the following description.

DETAILED DESCRIPTION

Figure 1:
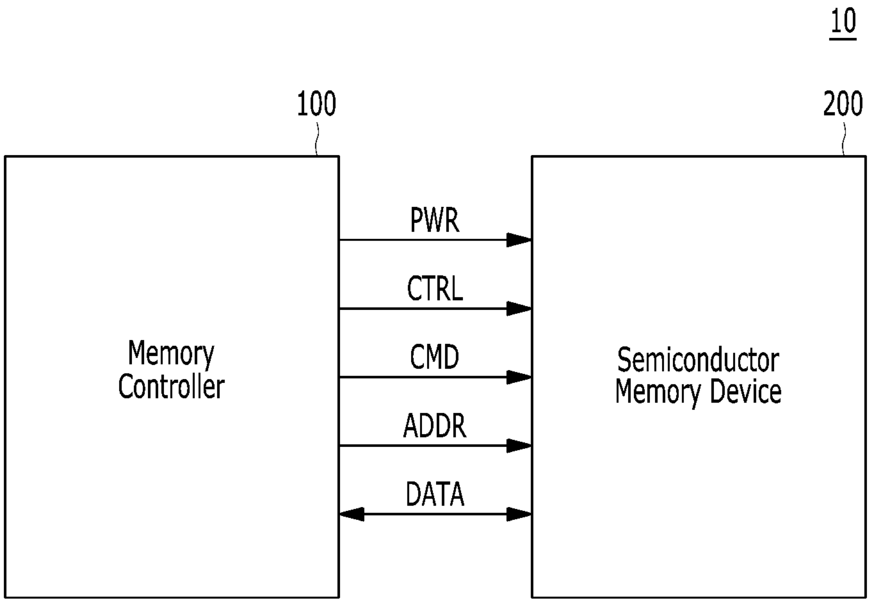
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

Embedded systems are designed to control a large number of external objects. For example, an embedded system such as a memory system controls many objects (e.g., physical memory blocks) included in a memory device.

FIG. 1 is a block diagram illustrating a memory system 10 in accordance with an embodiment of the present invention.

Referring FIG. 1, the memory system 10 may include a memory controller 100 and a semiconductor memory device 200, which may represent more than one such device. The semiconductor memory device(s) 200 may be flash memory device(s), particularly of the NAND-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to form a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
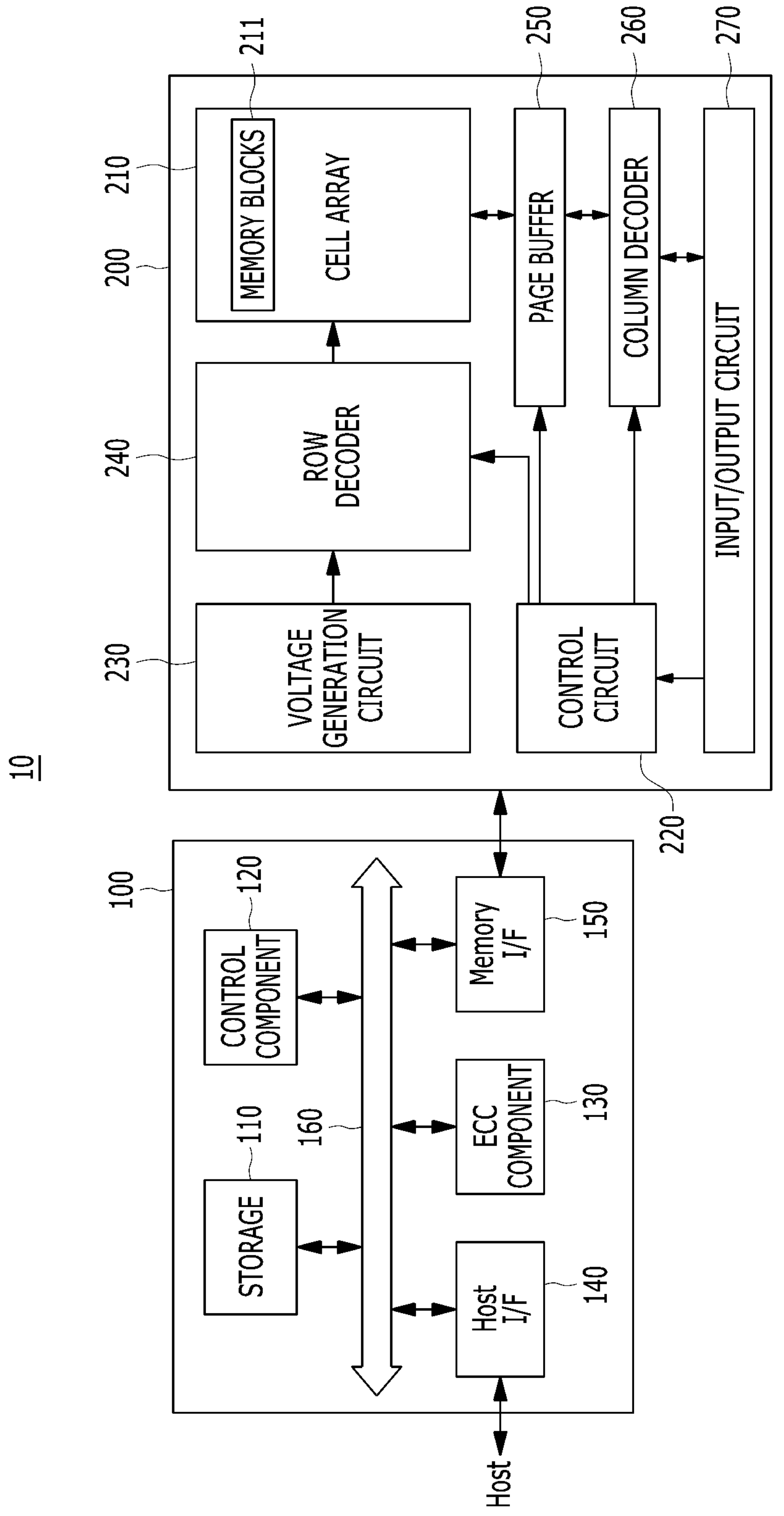
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In some embodiments, the ECC component 130 may perform an error correction operation based on a coded modulation such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). As such, the ECC component 130 may include all circuits, systems or devices for suitable error correction operation.

The host interface 140 may communicate with the host device through one or more of various interface protocols such as a universal serial bus (USB), a multi-media card (MMC), a peripheral component interconnect express (PCI-e), a small computer system interface (SCSI), a serial-attached SCSI (SAS), a serial advanced technology attachment (SATA), a parallel advanced technology attachment (PATA), an enhanced small disk interface (ESDI), an integrated drive electronics (IDE), and non-volatile memory express (NVMe).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
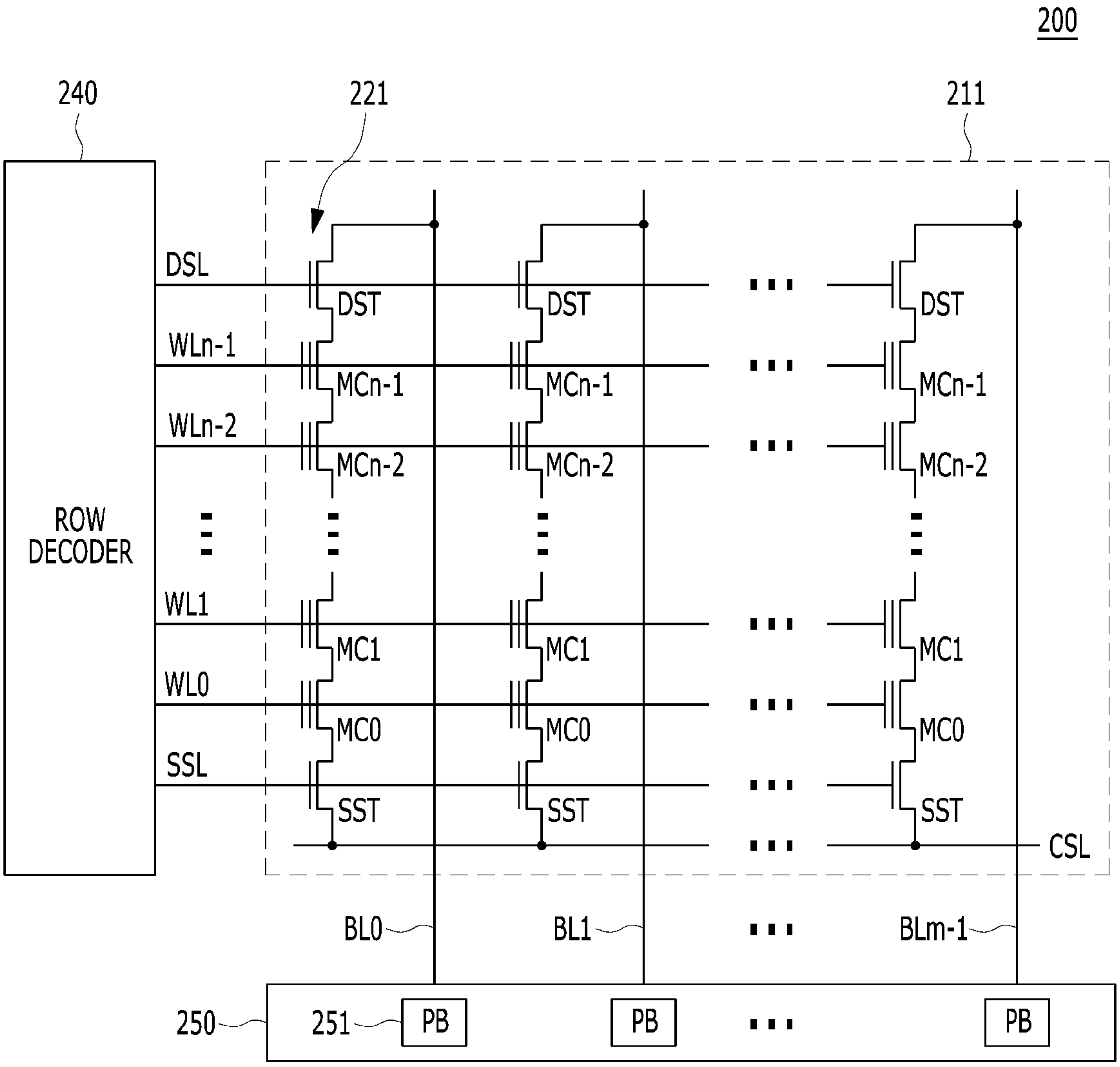
FIG. 3 is a circuit diagram illustrating a memory block of a memory device of a memory system in accordance with an embodiment of the present invention.

The page buffer 250 may be in electrical communication with the memory cell array 210 through bit lines BL (shown in FIG. 3). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit/receive data to/from the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 my temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
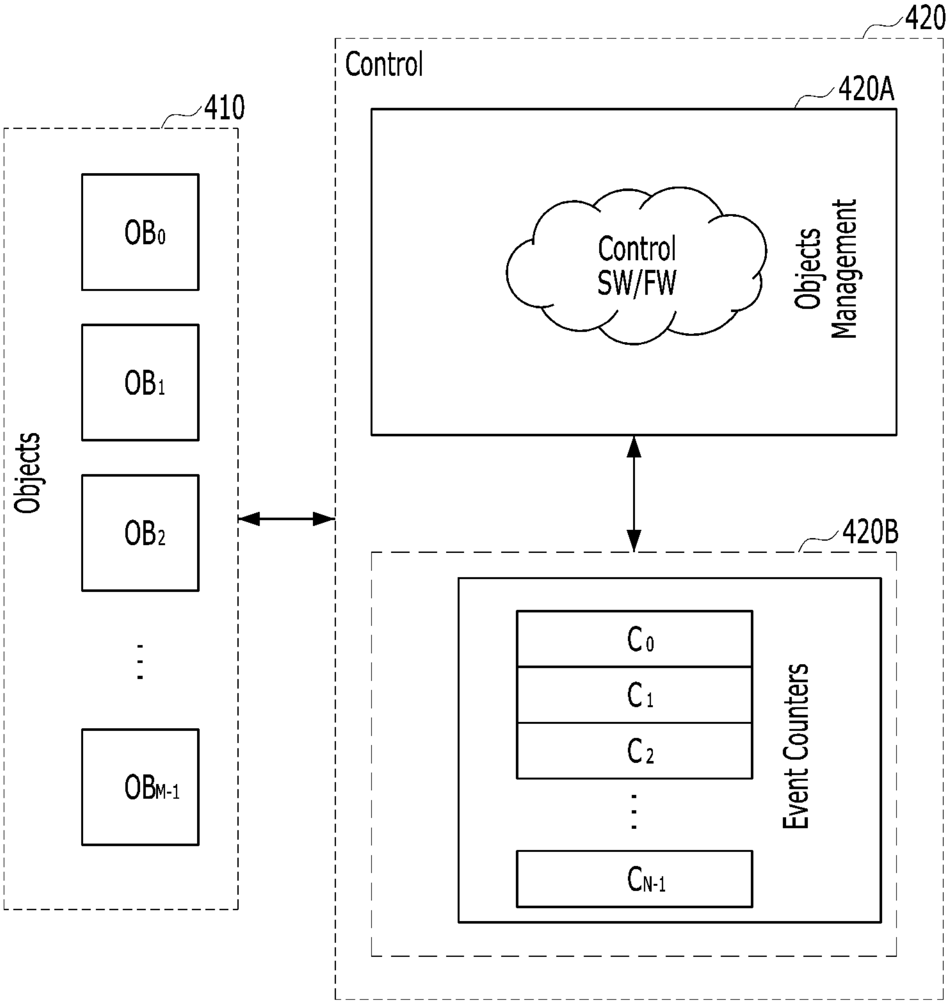
FIG. 4 is a diagram illustrating an example of an embedded system.

FIG. 4 is a diagram illustrating an example of an embedded system.

Referring to FIG. 4, the embedded system may include a plurality of objects 410 and a control component 420. The plurality of objects 410 may include M objects $OB_0$ to $OB_{M-1}$. The controller 420 may include a control component 420A and a storage 420B. When the embedded system includes the memory system 10 shown in FIG. 2, the plurality of objects 410 corresponds to the memory blocks 211 included in the memory device 200 of FIG. 2, and the controller 420 corresponds to the controller 100 of FIG. 2. The control component 420A may correspond to the control component 120 of FIG. 2, and the storage 420B may correspond to the storage 110 of FIG. 2.

The controller 420 may control the plurality of objects 410. In other words, the control component 420A may control management of the objects 410 through special control software (SW) or firmware (FW) running therein. The control component 420A may be implemented by one or more microprocessor(s). The storage 420B may include a plurality of event counters for management of the objects 410. The storage 420B may be implemented by a random access memory (RAM). For example, the plurality of event counters may include N event counters $C_0$ to $C_{N-1}$.

The controller 420 should frequently manage special events for all objects 410, which requires additional storage (e.g., RAM) space for event counters for monitoring and managing the objects 410. For example, the storage 420B may include RAM with organization (N×P) bits. The hardware overhead for RAM resource may be significant, depending on the number of objects M, the number of event counters N for the monitored objects, and the number of needed bits per event counter.

Usually, when one of the event counters $C_0$ to $C_{N-1}$ exceeds a threshold THOLD, which may be predefined, the control SW/FW of the control component 420A has to perform system actions (SA) to prevent negative effects on the monitored objects. Such actions require time and other system resources and may affect common system performance and endurance.

When the storage 420B (i.e., RAM) can store all event counters for all objects (i.e., N=M), there are no critical issues with event counters management algorithms. However, in the case of limited storage capacity (i.e., N«M), different techniques may be used for event counter management. For example, when knowledge of a precise number of occurrences of the external events is not necessary, the following algorithm based on approximate counters may be used: Jacek Cichon and Wojciech Macyna, Approximate counters for flash memory, 17th IEEE International Conference on Embedded and Real-Time Computing Systems and Applications, RTCSA 2011, Toyama, Japan, Aug. 28-31, 2011, Volume 1, 2011, pp. 185-189.

Figure 5:
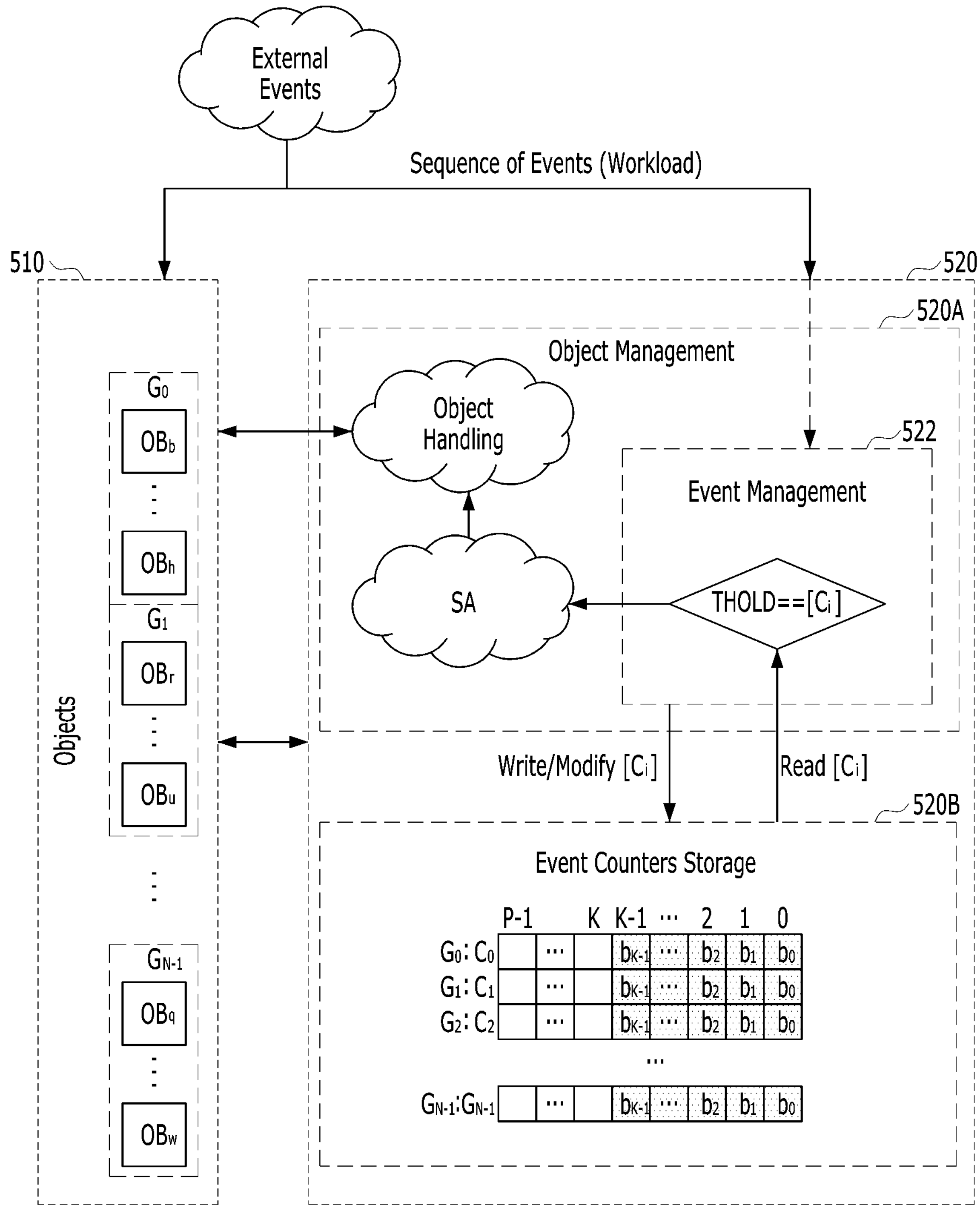
FIG. 5 is a diagram illustrating an example of an embedded system in accordance with an embodiment of the present invention.

For another example, as shown in FIG. 5, the monitored objects are grouped according to a defined group linking scheme (GLS), and each group belongs to a single event counter. Such scheme allows reducing the number of event counters.

FIG. 5 is a diagram illustrating an example of an embedded system in accordance with an embodiment of the present invention.

Referring to FIG. 5, the embedded system may include a plurality of objects 510 and a control component 520. The plurality of objects 510 may be grouped to include N groups $G_0$ to $G_{N-1}$ according to a defined group linking scheme (GLS). The first group $G_0$ may include objects $OB_b$ to $OB_h$. The second group $G_1$ may include objects $OB_r$ to $OB_u$. The group $G_{N-1}$ may include objects $OB_q$ to $OB_w$.

The controller 520 may include a control component 520A and a storage 520B. When the embedded system includes the memory system 10 shown in FIG. 2, the plurality of objects 510 corresponds to the memory blocks 211 included in the memory device 200 of FIG. 2, and the controller 520 corresponds to the controller 100 of FIG. 2. The control component 520A may correspond to the control component 120 of FIG. 2, and the storage 520B may correspond to the storage 110 of FIG. 2.

The controller 520 may control the plurality of objects 510. In other words, the control component 520A may control management of the objects 510 through special control software (SW) or firmware (FW) running on therein. The control component 520A may be implemented by one or more microprocessor(s). The storage 520B may include a plurality of event counters for management of the objects 510. The storage 520B may be implemented by a random access memory (RAM). For example, the plurality of event counters may include N event counters $C_0$ to $C_{N-1}$.

The control component 520A may receive a sequence of external events from an external device (e.g., the host device of FIG. 2) and control management of the objects 510 based on the external events. In various embodiments, the control component 520A may include an events management component 522. The events management component 522 may read count values of the event counters $C_0$ to $C_{N-1}$ and determine whether each of the event counters $C_0$ to $C_{N-1}$ exceeds a threshold THOLD, which may be predefined. The value of the threshold THOLD defines bits of each of the event counters $C_0$ to $C_{N-1}$ as follows: $K=\lceil \log_2(THOLD) \rceil$. In various embodiments, when the storage 520B may be implemented by a random access memory (RAM) with organization N×P bits, each of the event counters $C_0$ to $C_{N-1}$ may be implemented by a counter, which counts a value corresponding to K bits, and other (P−K) bits may be unused.

When it is determined that each of the event counters $C_0$ to $C_{N-1}$ exceeds the threshold THOLD, the control component 520A may issue corresponding system action (SA) and control the handling of the objects such that a corresponding object among the objects 510 performs an operation based on the issued system action.

The sequence of external events may form workloads, which are independent of the behavior of the monitored objects and control SW/FW of the control component 520A. As M monitored objects are grouped as N groups according to any defined group linking scheme (GLS), the total number N of event counters will be decreased. Otherwise, the number of the monitored objects mapped to a specific event counter will be increased. Therefore, event counters reach the threshold THOLD faster than the initial scheme (when M=N), and there may be a nonzero probability of false positive system action. The value of this probability may depend on the number of monitored objects per group and workloads. There are approaches to reduce the value of probability of false positive system action for certain workloads. For example, Daniel Tuers et al. in U.S. Pat. No. 9,230,689 B2 or WO 2015/142513 A1 disclose an approach to reduce the value of probability of false positive system action for certain workloads by a specific regrouping of the monitored objects with an adjustable amount of event counters.

In various embodiments, in order to reduce the probability of false positive system action for any type of workload, i.e., a sequence of events, the controller 520 may perform an event counter management method for an embedded system such as a memory system (e.g., a solid state drive (SSD)). In this case, the monitored objects are physical blocks (PBs), and external events are read requests from a host device. The method may be used to improve the firmware (FW) read disturbance protection algorithms, which should prevent or minimize user data corruption as a result of the read disturb effect in a memory device (e.g., 3D NAND). The method may be performed in the memory system with the device configuration shown in Table 1:

TABLE 1

| Configuration Parameter | Value |
|---|---|
| Total number of DIEs | 8 |
| Planes per DIE | 4 |
| Number of PBs per Super Block | 8*4 = 32 |
| PBs per Plane | 950 |
| Number of Super Blocks | 950 |
| Number of PBs | 32*950 = 30400 |
| Read Counter Size (defined by RAM organization) | 32 bits (4 Bytes) |

Figure 6:
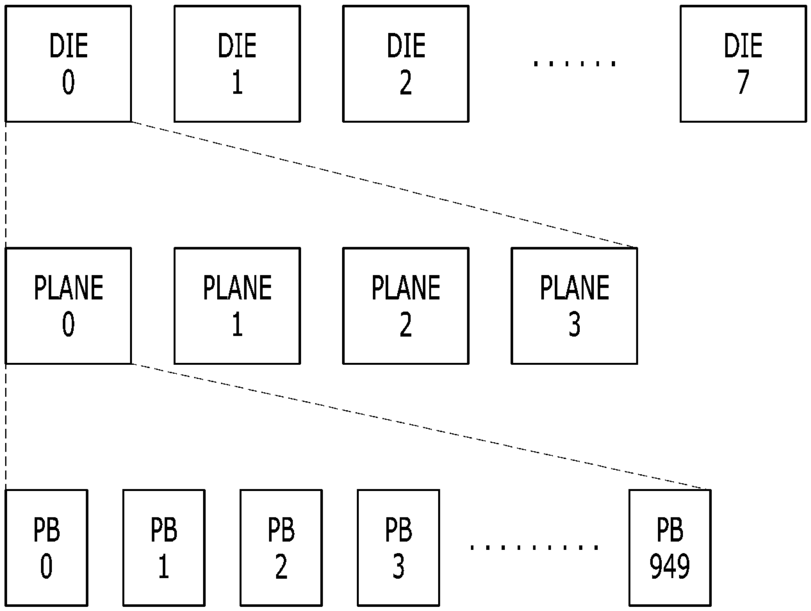
FIG. 6 is a diagram illustrating physical blocks included a memory device in accordance with an embodiment of the present invention.

FIG. 6 is a diagram illustrating physical blocks included a memory device in accordance with an embodiment of the present invention.

Referring to FIG. 6, as shown in Table 1, the memory device may include a plurality of dies, for example, 8 dies DIE0 to DIE7. Each of the dies may include a plurality of planes, for example, 4 planes PLANE0 to PLANE3. Each of the planes PLANE0 to PLANE3 may include a plurality of physical blocks, for example, 950 physical blocks PB0 to PB949.

Figure 7:
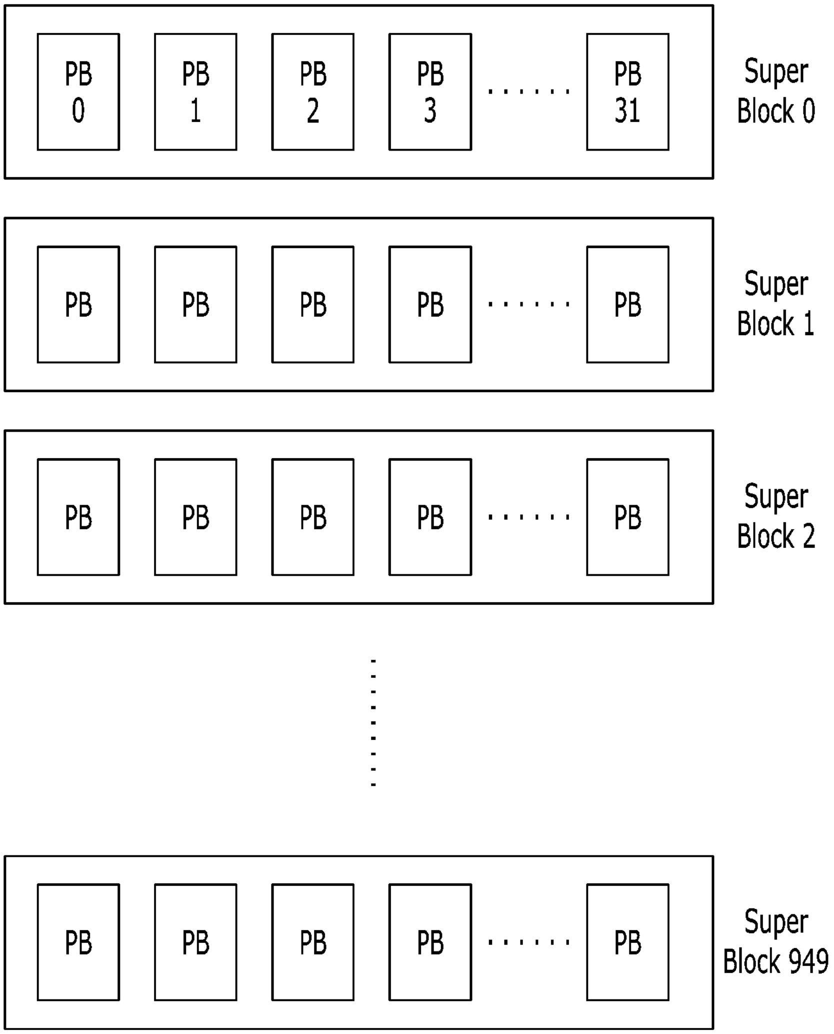
FIG. 7 is a diagram illustrating super blocks included a memory device in accordance with an embodiment of the present invention.

FIG. 7 is a diagram illustrating super blocks included a memory device in accordance with an embodiment of the present invention.

Referring to FIG. 7, as shown in Table 1, the memory device may include a plurality of super blocks, for example, 950 super blocks SuperBlock0 to SuperBlock949. Each of the super blocks SuperBlock0 to SuperBlock949 may include 32 physical blocks, for example PB0 to PB31.

Referring again to FIG. 5, to prevent data corruption due to reads (i.e., host reads) from an external device (e.g., a host device), when the number of read operations from a particular physical block reaches a threshold THOLD, the control component 520A (i.e., firmware (FW)) should not allow any more reads from that physical block. The threshold THOLD may be defined in the product requirements document for the memory system. For example, the value of the threshold THOLD may be THOLD=140000. Therefore, to fully satisfy the product requirements, the control component 520A has to manage read counters per physical block. If a read counter Ci reaches the threshold THOLD, the control component 520A may perform system action on the corresponding physical block. For example, the control component 520A performs data relocation (e.g., garbage collection (GC)) on the corresponding physical block.

As shown in Table 1, each read counter size (i.e., each event counter size) may 32 bits (or 4 Bytes). Hence, storing event counters for all physical blocks (PBs) requires NumberOfPhysicalBlocks*ReadCounterSize=30400*4=121600 Bytes of the storage 520B (e.g., RAM). In case of limited RAM resources, it is impossible to manage counter per PBs. Therefore, as shown in FIG. 5, the control component 520A manages a read counter per a particular group (e.g., Super Block) in accordance with a particular group linkage scheme (GLS). The GLS scheme is the linkage between super blocks and read counters. Super blocks may be mapped to read counters by super block index. The accuracy of GLS is lower compared with the scheme of the read counters per PBs. However, more PBs are mapped to read counters, hence the operation is faster and the required size of the storage 520B to store all read counters is reduced. When the number of super blocks is 950, the required size of the storage 520B (e.g., RAM) to store all read counters is NumberOfSuperBlocks*ReadCounterSize=950*4=3800 Bytes. The frequency of data relocation (e.g., GC) does not depend on the host read workload (e.g., sequential or random), and the control component 520A calls for data relocation after read operations from a particular super block exceeds THOLD, which may be set at 140000.

The maximal count value for each super block is THOLD=140000. If the read counter reaches the threshold value THOLD, the control component 520A (e.g., FW) calls for data relocation (e.g., GC). After the data relocation, the read counter is set to zero. To store this maximal value, only some bits (e.g., 18 bits) among the read counter size (e.g., 32 bits) are used according to the following: $\lceil \log_2(\text{THOLD}) \rceil = \lceil \log_2(140000) \rceil = 18$ bits. When the storage 520B is implemented by a RAM, the read counter size (e.g., 32 bits) is determined by RAM organization. Therefore, in order to increase the accuracy, the control component 520A (e.g., FW) has to use 14 (=32−18) unused bits.

As described above, in various embodiments, the controller 520 of FIG. 5 may perform an event counter management method for an embedded system such as a memory system (e.g., a solid state drive (SSD)). In particular, the event counter management algorithm exploits the unused bits of each counter (P−K).

In FIG. 5, the monitored objects 510 have already been grouped according to defined group linkage scheme. Therefore, the number of event counters included in the storage 520B is estimated once according to the available resource of the storage 520B (i.e., RAM resource) and it does not change at the run time. Each group has its own event counter, and any monitored object from the group does not affect any other event counters.

Figure 8:
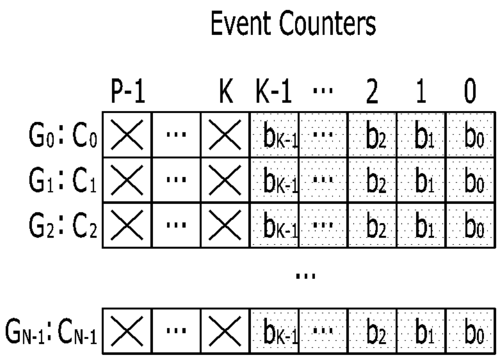
FIG. 8 is a diagram illustrating event counters in accordance with an embodiment of the present invention.

FIG. 8 is a diagram illustrating event counters in accordance with an embodiment of the present invention.

Referring to FIG. 8, there are a plurality of event counters $C_0$ to $C_{N-1}$. The event counters $C_0$ to $C_{N-1}$ may be included in the storage 520B (e.g., RAM) of FIG. 5. When the storage 520B is implemented by a RAM, the size of the event counters $C_0$ to $C_{N-1}$ is determined by RAM organization (e.g., N×P bits). In other words, the size of each of the event counters $C_0$ to $C_{N-1}$ is determined by RAM organization (e.g., P bits). As described above, if any of the event counters reaches the threshold value THOLD=140000, only some bits $b_0$ to $b_{K-1}$ (e.g., K=18 bits), among the total number of bits (e.g., bits $b_0$ to $b_{P-1}$=32 bits) defining the size of the event counter, are used. In various embodiments, the control component 520A (e.g., FW) may exploit the 14 (=32−18) unused bits.

Figure 9:
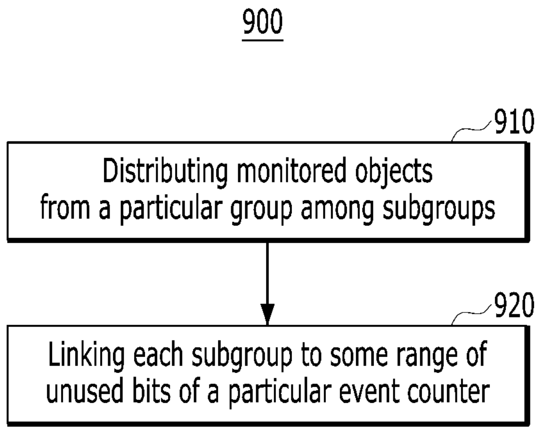
FIG. 9 is a flowchart illustrating an operation of a subgroup linking scheme in accordance with an embodiment of the present invention.

FIG. 9 is a flowchart illustrating an operation 900 of subgroup linking scheme (SLS) in accordance with an embodiment of the present invention.

Referring to FIG. 9, the SLS operation 900 may include distributing (910) monitored objects from a particular group among subgroups, and linking (920) each subgroup to some range, among multiple non-overlapping ranges, of the unused bits of a particular event counter. Each range of unused bits may be as associated with a particular subcounter of multiple subcounters. Since only the unused bits of the event counter are exploited, subcounters do not require any additional RAM resources.

Figure 10A:
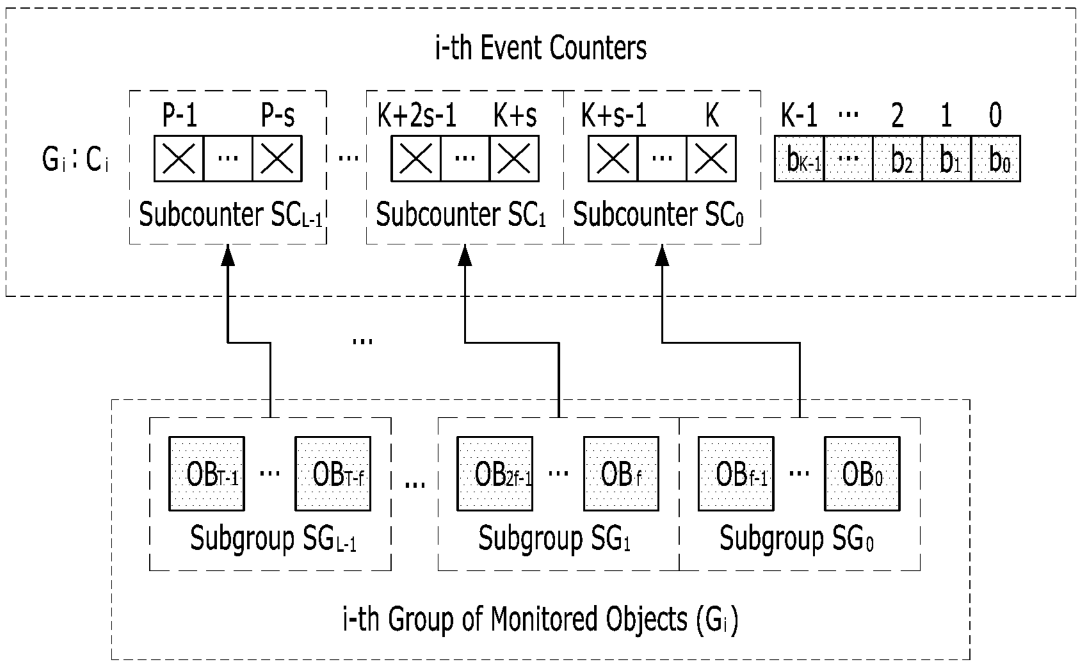
FIG. 10A is a diagram illustrating a subgroup linking scheme in accordance with an embodiment of the present invention.

FIG. 10A is a diagram illustrating a subgroup linking scheme (SLS) in accordance with an embodiment of the present invention.

Referring to FIG. 10A, according to the SLS, monitored objects from a particular group $G_i$ may be distributed within subgroups $SG_0$ to $SG_{L-1}$. Objects $OB_0$ to $OB_{T-1}$ in the particular group $G_i$ are uniquely numbered from 0 to (T−1). In other words, the number of monitored objects per i-th group is T. Each monitored object may be assigned only to one subgroup.

In various embodiments, the objects within a subgroup may be defined in a sequential order, assuming a uniformly distributed sequence of external events. Alternatively, the objects within a subgroup may be defined in the most suitable form according to the sequences of the external events. In other words, according to distribution of sequence of external events, the objects within a subgroup may be defined in an appropriate order. For example, if there are objects from the group which are frequently affected by some sequence of external events, then these objects may be linked to different subgroups. For these operations, the order of external events may be predefined on device design stage by analysis of typical workloads or may be defined by online workload analysis with built-in hardware or software module.

Objects within the subgroup $SG_0$ may include objects $OB_0$ to $OB_{f-1}$. Objects within the subgroup $SG_1$ may include objects $OB_f$ to $OB_{2f-1}$. Objects within the subgroup $SG_{L-1}$ may include objects $OB_{T-f}$ to $OB_{T-1}$.

The subgroups $SG_0$ to $SG_{L-1}$ may be linked to subcounters $SC_0$ to $SC_{L-1}$ in the particular event counter $C_i$. The subgroup $SG_0$ may be linked to the subcounter $SC_0$. The subgroup $SG_1$ may be linked to the subcounter $SC_1$. The subgroup $SG_{L-1}$ may be linked to the subcounter $SC_{L-1}$.

In various embodiments, if the event counter $C_i$ is implemented by P bits including $b_0$ to $b_{P-1}$, subcounters $SC_0$ to $SC_{L-1}$ are implemented by (P−K) bits including $b_K$ to $b_{P-1}$. In other words, when the size of the event counter is P=32 bits according to the RAM organization (or size) and the threshold value of the event counter is THOLD=140000 (corresponding to 18 bits), the subcounters $SC_0$ to $SC_{L-1}$ may be implemented based on the unused bits (i.e., 14 bits) among bits corresponding to the size of the event counter.

In FIG. 10A, for the event counter, subgroups and objects, parameters may be defined as indicated in Table 2.

In Table 2, L represents the number of subgroups in the i-th group and the number of subcounters in the i-th event counter. s represents the number of allocated bits per subgroup in the i-th event counter, where s≥1. In other words, s represents the size of each of the subcounters. f represents the number of monitored objects in a subgroup.

TABLE 2

| Parameter | Definition |
|---|---|
| L | the number of subgroups in the i-th group and subcounters in the i-th event counter |
| s ≥ 1 | the number of allocated bits per subgroup in the i-th event counter |
| f | the number of monitored objects in a subgroup |

In various embodiments, the number of monitored objects per subgroups may be different or the same. In various embodiments, the value of s may be defined experimentally based on the number of unused bits, such that it should be optimal for the target Host workloads. In other words, the size of the subcounter (i.e., the number of allocated bits per subcounter or subgroup) may be determined based on the number of the unused bits among bits corresponding to the size of the event counter.

The SLS scheme above may allow use of all available bits of each event counter in external events counting. As a result, it may improve the accuracy of reaching threshold THOLD to call system action (SA).

In various embodiments, parameters of the algorithm may be optimized. One of the main parameters is the number of bits per subcounter or the size of the subcounter (i.e., s). Its optimal value depends on the target workloads. Based on the number of unused bits, the value of s may be defined experimentally.

Another parameter for optimization is an SLS scheme. If the amount of subcounters is a multiplier of T, simple addressing may be used to calculate the subcounter index using the index of the monitored object. If the amount of subcounters is not a multiplier of T, any hash function may be used to uniformly distribute grouped objects per subcounters.

In various embodiments, the adjusting method for the counter management algorithm comprises steps as shown in the following list:

1. For all $1 \le s \le P - K$
   Calculating the maximal value of event counter and the number of monitored objects per subgroup based on the defined value of s.
   Defining SLS.
   Calculating the required metrics by a computer simulation or real device.
      Metrics example: the number of external events before SA call, using target workloads.
2. Based on a range of gathered metrics, define parameter s and the most suitable SLS for the future implementation.

Figure 10B:
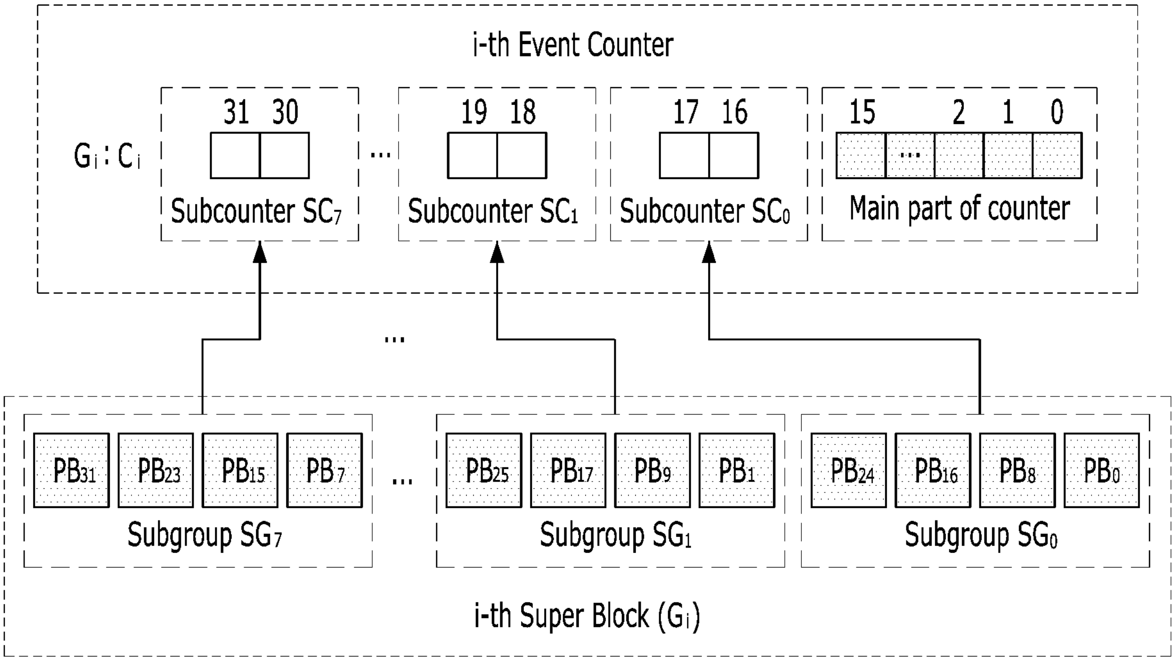
FIG. 10B illustrates an example of a subgroup linking scheme in accordance with an embodiment of the present invention.

FIG. 10B illustrates an example of a subgroup linking scheme (SLS) in accordance with an embodiment of the present invention.

Referring to FIG. 10B, monitored objects may correspond to physical blocks (PBs), and a particular group $G_i$ may correspond to a super block. According to the SLS, monitored physical blocks (PBs) from a particular super block $G_i$ may be distributed within multiple subgroups. The subgroups may be linked to multiple subcounters of a particular read counter $C_i$. The read counter $C_i$ may include a main counter as a main part of counter, and multiple subcounters. Bits for the main counter and bits for each of the multiple subcounters may be determined as the description below.

It is assumed that the number of allocated bits per subgroup is determined as s=2. In this case, the size of each subcounter is 2 bits and a threshold value is $$MTHOLD = \frac{THOLD}{2^s} = \frac{140000}{2^2} = 35000.$$

In various embodiments, the threshold value may be used for data relocation such as garbage collection (GC). The threshold value requires only $\lceil \log_2(\mathrm{MTHOLD}) \rceil = \lceil \log_2(35000) \rceil = 16$ bits. Thus, 32−16=16 bits are available for the PBs grouping and mapping to subcounters. Hence, the total number of subgroups is $$\frac{ReadCounterSize - \lceil \log_2(MTHOLD) \rceil}{s} = \frac{32 - 16}{2} = 8.$$

Taking into account the number of PBs per super block (i.e., 32), the number of physical blocks per subgroup is $$\frac{PhysicalBlocksPerSuperBlock}{NumberOfSubgroups} = \frac{32}{8} = 4.$$

PBs may be mapped to subcounters using the PB index in the particular super block. Such mapping scheme is called as SLS, according to the above definitions. SLS may be defined in various forms, but it should be the most suitable for target workloads as described above. In various embodiments, PBs relate to the same subgroup if the remainders after the division of PBs indices by the total number of subgroups are the same.

32 physical blocks in the particular super block $G_i$ are uniquely numbered from 0 to 31 as physical blocks $PB_0$ to $PB_{31}$. The indices of the monitored physical blocks within a subgroup may be defined in the most suitable form according to the sequences of the external events. For example, if there are physical blocks from the group which are frequently affected by some sequence of external events, then these physical blocks may be linked to different subgroups.

Physical blocks within the subgroup $SG_0$ may include physical blocks $PB_0$, $PB_8$, $PB_{16}$ and $PB_{24}$. Physical blocks within the subgroup $SG_1$ may include physical blocks $PB_1$, $PB_9$, $PB_{17}$ and $PB_{25}$. Physical blocks within the subgroup $SG_2$ may include physical blocks $PB_2$, $PB_{10}$, $PB_{18}$ and $PB_{26}$. Physical blocks within the subgroup $SG_3$ may include physical blocks $PB_3$, $PB_{11}$, $PB_{19}$ and $PB_{27}$. Physical blocks within the subgroup $SG_4$ may include physical blocks $PB_4$, $PB_{12}$, $PB_{20}$ and $PB_{28}$. Physical blocks within the subgroup $SG_5$ may include physical blocks $PB_5$, $PB_{13}$, $PB_{21}$ and $PB_{29}$. Physical blocks within the subgroup $SG_6$ may include physical blocks $PB_6$, $PB_{14}$, $PB_{22}$ and $PB_{30}$. Physical blocks within the subgroup $SG_7$ may include physical blocks $PB_7$, $PB_{15}$, $PB_{23}$ and $PB_{31}$.

The subgroups $SG_0$ to $SG_7$ may be linked to subcounters $SC_0$ to $SC_7$ in the particular read counter $C_i$. The subgroup $SG_0$ may be linked to the subcounter $SC_0$. The subgroup $SG_1$ may be linked to the subcounter $SC_1$. The subgroup $SG_2$ may be linked to the subcounter $SC_2$. The subgroup $SG_3$ may be linked to the subcounter $SC_3$. The subgroup $SG_4$ may be linked to the subcounter $SC_4$. The subgroup $SG_5$ may be linked to the subcounter $SC_5$. The subgroup $SG_6$ may be linked to the subcounter $SC_6$. The subgroup $SG_7$ may be linked to the subcounter $SC_7$. If the read counter $C_i$ is implemented by 32 bits including $b_0$ to $b_{31}$, the main part of the read counter $C_i$ (i.e., the main counter) is implemented by 16 bits including $b_0$ to $b_{15}$, the subcounters $SC_0$ to $SC_7$ are implemented by 16 bits including $b_{16}$ to $b_{31}$.

Figure 11:
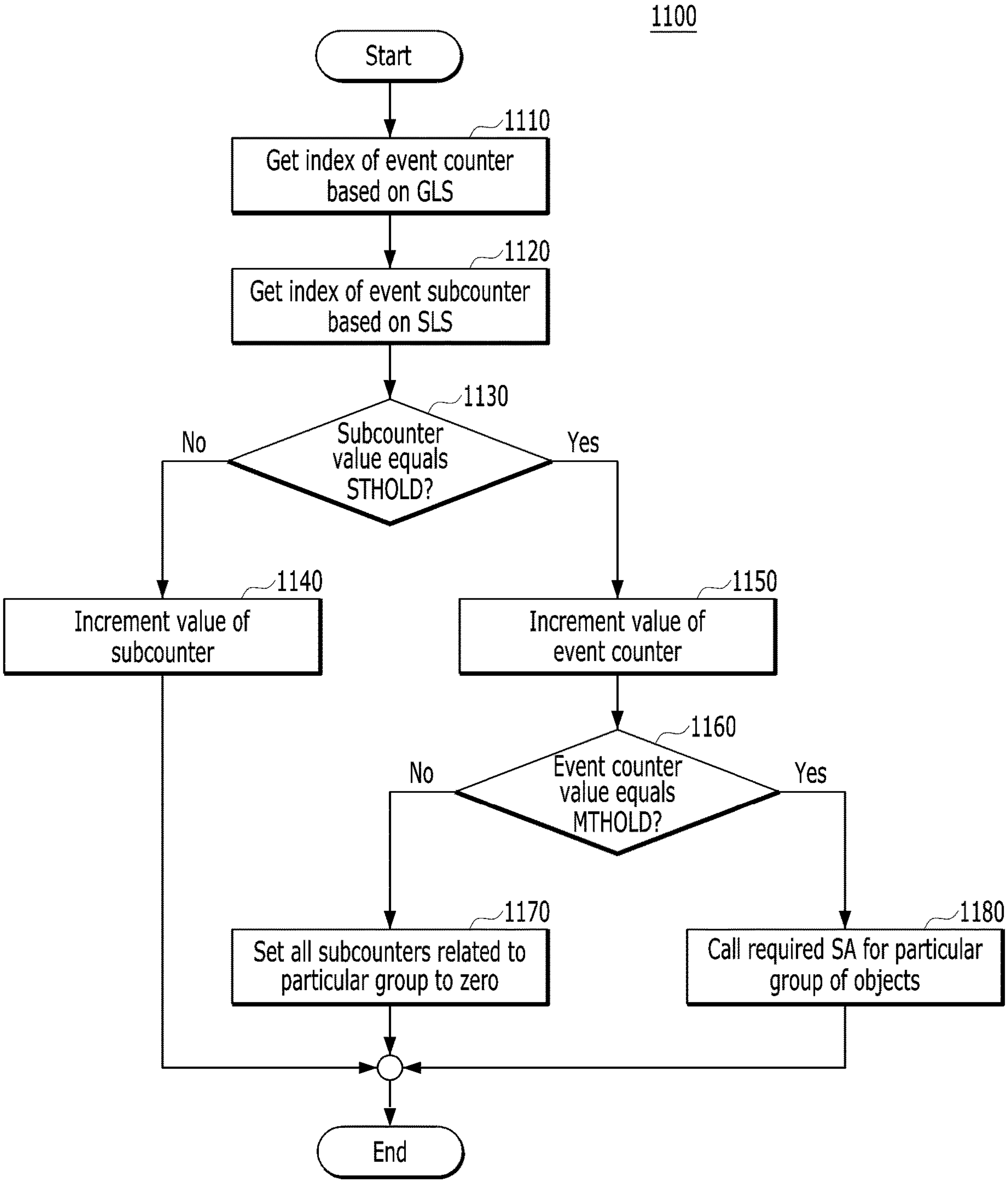
FIG. 11 is a flowchart illustrating an event management operation in accordance with an embodiment of the present invention.

FIG. 11 is a flowchart illustrating an event management operation 1100 in accordance with an embodiment of the present invention. For example, the event management operation of FIG. 11 may be performed by the control component 520A included in the controller 520 of FIG. 5.

Referring to FIG. 11, at step 1110, the control component 520A may get index of an event counter based on a group linking scheme (GLS). At step 1120, the control component 520A may get index of a subcounter based on a subgroup linking scheme (SLS). At step 1130, the control component 520A may determine whether the current value of the subcounter reaches a threshold value, i.e., the maximal value of STHOLD ($=2^s-1$), which value may be predetermined.

When it is determined that the current value of the subcounter does not equal to the threshold value STHOLD (step 1130, No), at step 1140, the control component 520A may increment the value of the subcounter.

When it is determined that the current value of the subcounter equals to the threshold value STHOLD (step 1130, Yes), at step 1150, the control component 520A may increment the value of the event counter. At step 1160, the control component 520A may determine whether the current value of the event counter reaches a threshold value, i.e., the maximal value of $$MTHOLD\left(=\frac{THOLD}{2^s}\right),$$

which value may be predetermined.

When it is determined that the current value of the event counter does not equal to the threshold value MTHOLD (step 1160, No), at step 1170, the control component 520A may set all subcounters related to a particular group of monitored objects to zero.

When it is determined that the current value of the event counter equals to the threshold value MTHOLD (step 1160, Yes), at step 1180, the control component 520A may call the required system action (SA) for the particular group of the monitored objects. For example, the control component 520A may call a garbage collection (GC) operation for a particular super block including multiple physical blocks.

To explain the reduction of the initial value of THOLD at step 1160, it is assumed that external events affect only one single monitored object related to the i-th group with K-bit THOLD for the SA call. In this case, if a subcounter has already reached STHOLD, the event counter must be increased by a value $2^s$ at step 1150 to call the required SA in time. Therefore, the event counter should always be increased by this value for any other workloads. It is equivalent to increasing the event counter by 1 with a modified threshold $$MTHOLD=\frac{THOLD}{2^s}.$$

This approach is preferable because MTHOLD (i.e., 16 bits) requires less bits than K-bit THOLD (i.e., 18 bits). Additional bits may be used to increase the number of subgroups. This should have a positive effect on the accuracy of the proposed scheme.

FIG. 12A to FIG. 12D illustrate examples of the states of bits of read counters as an event management operation is performed in accordance with an embodiment of the present invention. These examples correspond to the case that the controller 520 of FIG. 5 receives a sequence of events such as read requests from an external device (e.g., a host device), and processes the read requests from the i-th super block $G_i$ included in a memory device 510 according to the aforementioned algorithm.

Figure 12A:
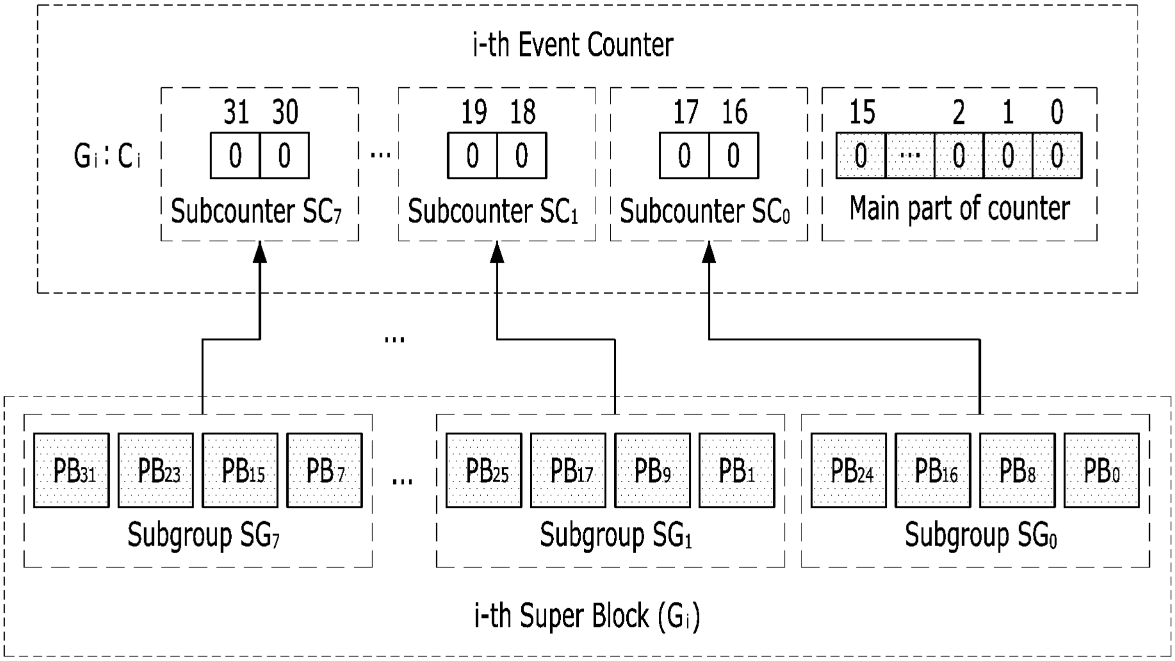
FIG. 12A to FIG. 12D illustrate state of bits of read counters by an event management operation in accordance with an embodiment of the present invention.

Referring to FIG. 12A, it is assumed that the host device reads data from a physical block (PB) which index is 1 ($PB_1$). According to the SLS, the PB $PB_1$ relates to the 1st subgroup $SG_1$, which is linked to the 1st subcounter $SC_1$.

Figure 12B:
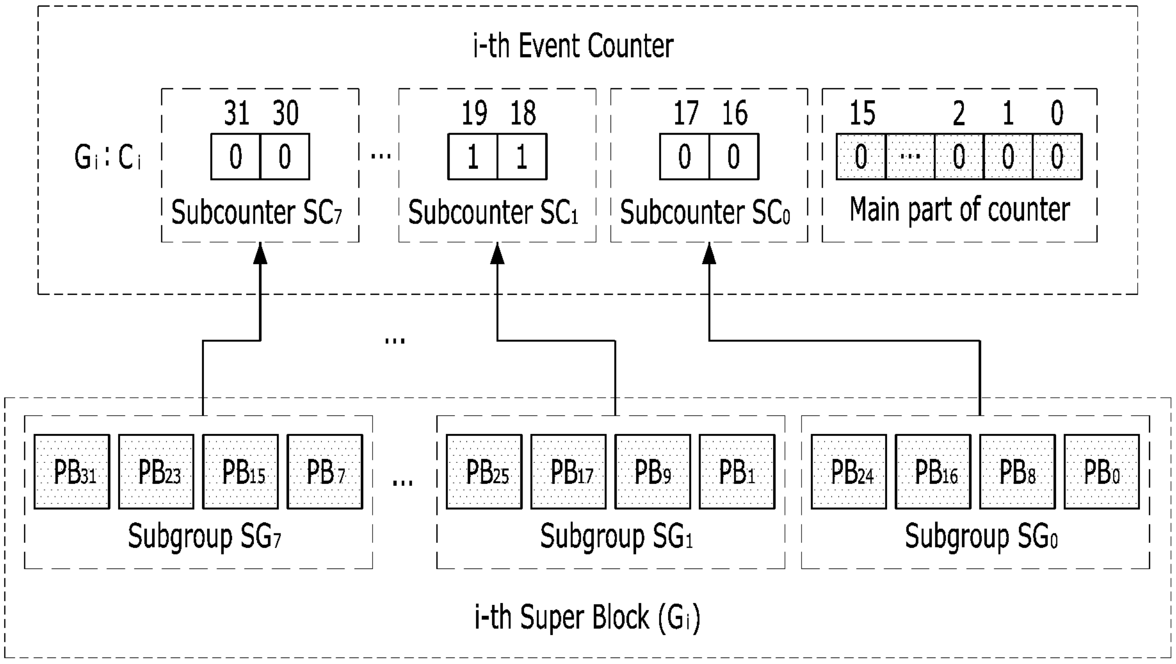

If the host device reads any three pages from the physical block $PB_1$, the subcounter $SC_1$ should be increased by 3. Hence, after processing of reads from the host device, the i-th read counter should have the state of bits as shown in FIG. 12B. In FIG. 12B, the subcounter $SC_1$ of the i-th read counter have the state of bits "11".

Figure 12C:
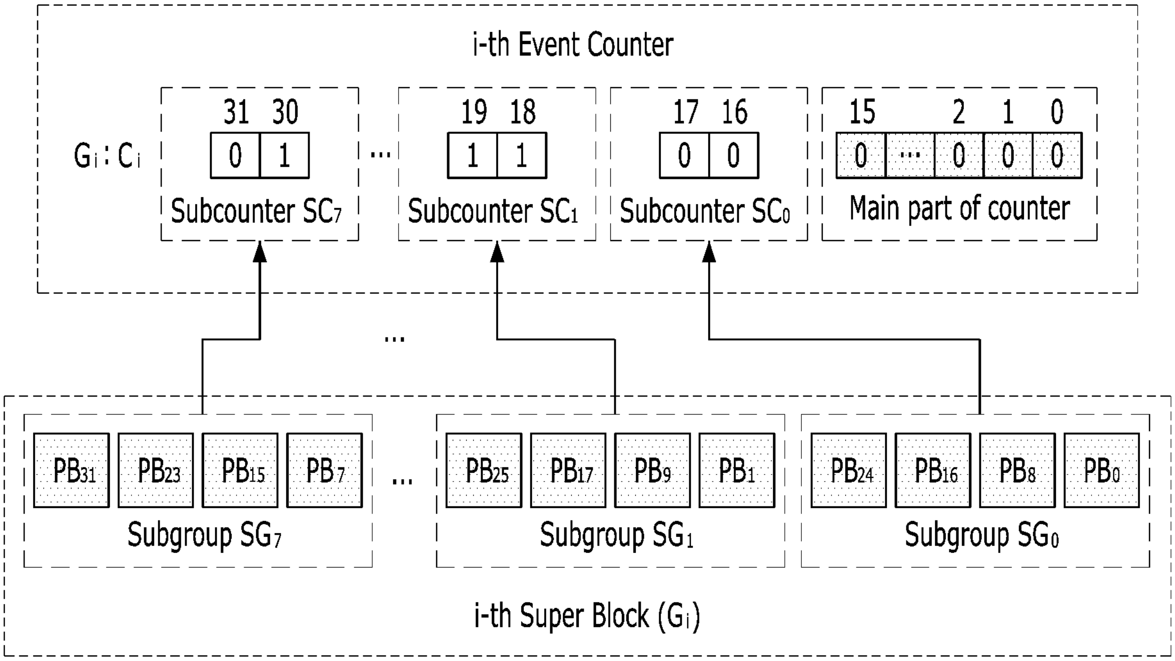

It is assumed that the next request from the host device is the read data which relates to the physical block with index 23, i.e., $PB_{23}$. The physical block $PB_{23}$ relates to the subgroup with index 7, i.e., $SG_7$. Hence, the counter value of the 7th subcounter $SC_7$ may be increased to have the state of bits as shown in FIG. 12C. In FIG. 12C, the subcounter $SC_7$ of the i-th read counter have the state of bits "01".

Figure 12D:
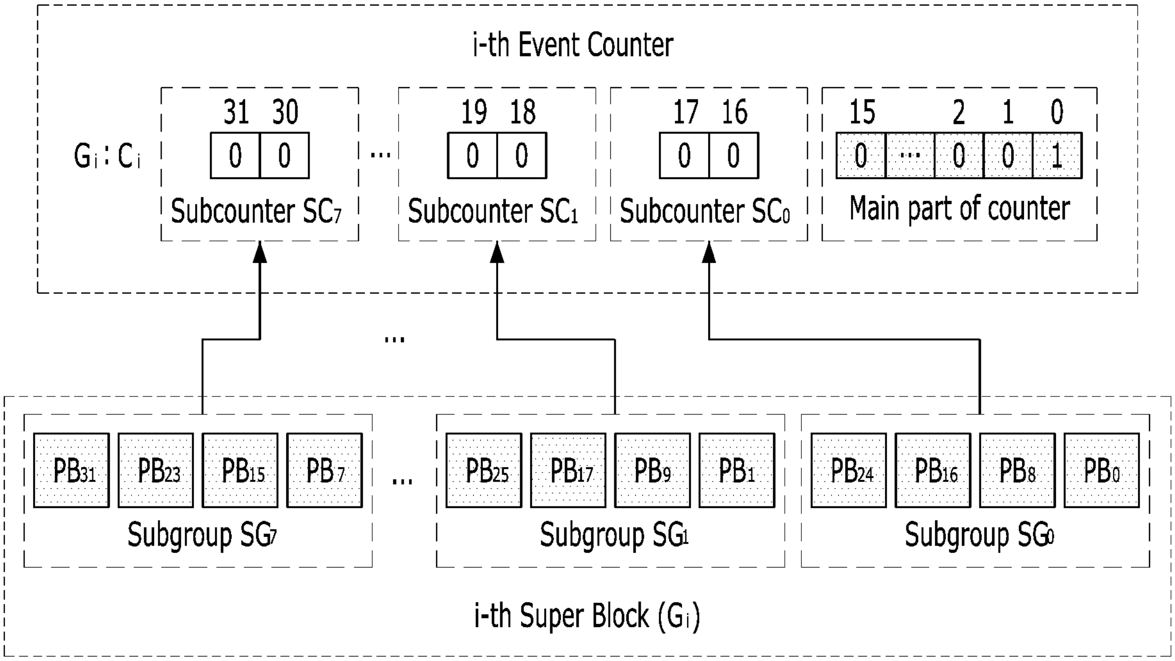

As can be seen from FIG. 12C, the subcounter $SC_1$ reaches its maximal value STHOLD ($=2^s-1=2^2-1=3$). Therefore, in case of any further reads from the 1st, 9th, 17th or 25th PBs, all subcounters should be set to "0" and the main part of the read counter $C_i$ should be incremented as shown in FIG. 12D. In FIG. 12D, all subcounters have the state of bits "00" and the main part of the read counter have the state of bits "0 . . . 001".

Referring again to FIG. 12C, the read operation from the physical block $PB_{23}$ does not increase the main part of the read counter. The controller 520 of FIG. 5 may manage further reads from the i-th super block in the same manner, while the main part of the read counter doesn't reach the value of MTHOLD=35000. This allows meeting the read disturb protection requirements by doing more read operations from the super block.

Figure 13:
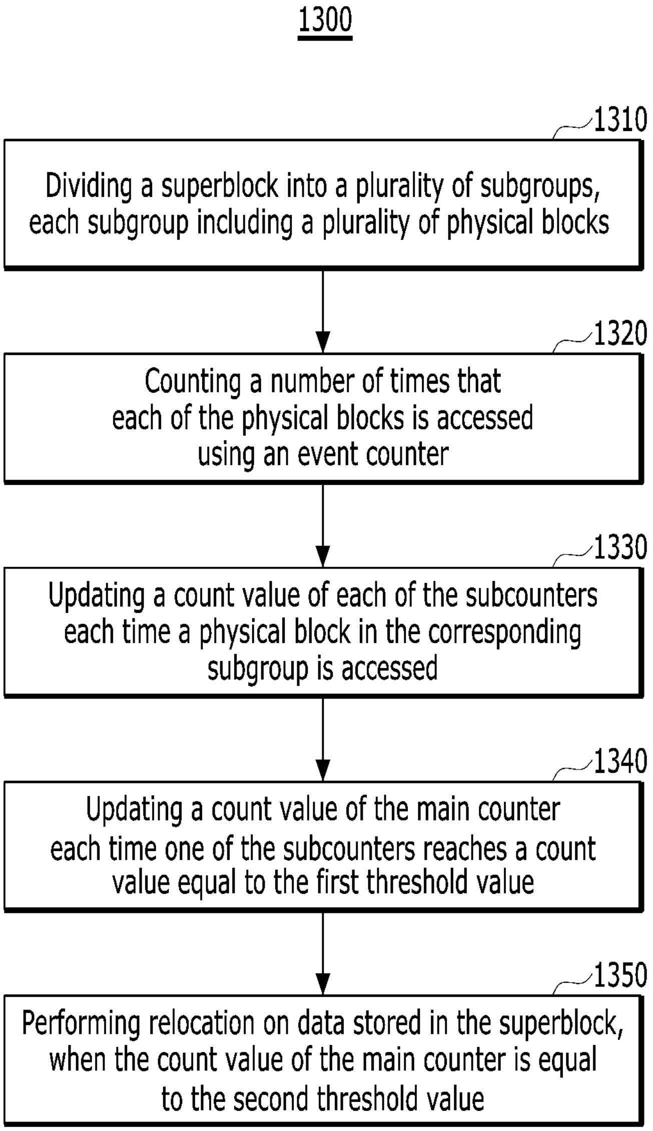
FIG. 13 is a flowchart illustrating read requests management operation in accordance with an embodiment of the present invention.

FIG. 13 is a flowchart illustrating read requests management operation 1300 in accordance with an embodiment of the present invention. For example, the read requests management operation of FIG. 13 may be performed by the control component 520A included in the controller 520 of FIG. 5. The controller 520 may include a non-transitory computer-readable storage medium storing a set of instructions for the controller 520 to perform operations for managing events, as shown in FIG. 13.

Referring to FIG. 13, the read requests management operation 1300 may include steps 1310, 1320, 1330, 1340 and 1350.

At step 1310, the controller 520 may divide a superblock, among the plurality of superblocks, into a plurality of subgroups. Each subgroup may include a plurality of physical blocks.

In an embodiment, the controller 520 may assign the plurality of physical blocks based on the sequence of events such that physical blocks affected by the sequence of events are linked to different groups.

In another embodiment, the controller 520 may assign the plurality of physical blocks in a sequential order based on the sequence of events such that physical blocks are alternatively linked to different groups.

At step 1320, the controller 520 may assign an event counter for counting a sequence of events that each of the physical blocks is accessed.

In various embodiments, the event counter includes a main counter and a plurality of subcounters respectively corresponding to the plurality of subgroups. The size of each of the subcounters may be determined based on a first threshold value. The size of the main counter may be determined based on a second threshold value.

In various embodiments, the controller 520 allocates the event counter for counting an event of read request that the one superblock is accessed for a read operation.

In various embodiments, the size of the event counter is determined based on the size of a random access memory (RAM) and a threshold value for the relocation.

In various embodiments, the first threshold value is determined based on the size of each of the subcounters, and the second threshold value is determined based on the size of each of the subcounters and the threshold value.

In various embodiments, the sequence of events includes read requests for the physical blocks.

At step 1330, the controller 520 may update a count value of each of the subcounters each time a physical block in the corresponding subgroup is accessed.

At step 1340, the controller 520 may update a count value of the main counter each time one of the subcounters reaches a count value equal to the second threshold value.

At step 1350, the controller 520 may perform relocation on data stored in the superblock when the count value of the main counter is equal to the first threshold value.

In various embodiments, the relocation includes a garbage collection on the one superblock.

As the foregoing describes, embodiments of the present invention provide an event management method based on subgroup link scheme (SLS). The embodiments exploit the unused bits of each event counter. Specifically, the embodiments reduce the frequency of unnecessary system action (e.g., data relocation such as garbage collection (GC)) calls, which are used to protect user data from read disturb in an embedded system such as 3D NAND flash-based storage system with a limited range of RAM resources. It ensures the increase of device performance and endurance.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A method for operating an embedded system including a memory system having a memory device with a plurality of groups of objects, the method comprising:

dividing a group of objects, among the plurality of groups of objects, into a plurality of subgroups, each subgroup including a plurality of objects;

counting a number of times that each of the objects is affected by an external event using an event counter, the event counter including a main counter and a plurality of subcounters respectively corresponding to the plurality of subgroups, a size of each of the subcounters determined based on a first threshold value, a size of the main counter determined based on a second threshold value;

updating a count value of each of the subcounters each time an object in the corresponding subgroup is affected by the external event;

updating a count value of the main counter each time one of the subcounters reaches a count value equal to the first threshold value; and performing system action on the group of objects, when the count value of the main counter is equal to the second threshold value, wherein each of the subcounters operates using a specific range of unused bits of the main counter among multiple non-overlapping ranges of unused bits of the main counter, wherein a size of the event counter is determined based on a size of a random access memory (RAM) and a relocation threshold value for relocation, and wherein the first threshold value is determined based on the size of each of the subcounters.

2. The method of claim 1, wherein each of the physical blocks is accessed for a read operation.

3. The method of claim 1, wherein the second threshold value is determined based on the size of each of the subcounters and a system action threshold value.

4. The method of claim 1, wherein the dividing of the group of objects comprises assigning the plurality of objects to different subgroups of the plurality of subgroups for evenly distributed access.

5. The method of claim 1, wherein the dividing of the group of objects comprises assigning the plurality of objects to different subgroups of the plurality of subgroups to avoid consecutive access to the same subgroup.

6. The method of claim 1, further comprising receiving of the external event by the objects.

7. An embedded system comprising:

a memory system including a memory device with a plurality of groups of objects; and a controller suitable for:

dividing a group of objects, among the plurality of groups of objects, into a plurality of subgroups, each subgroup including a plurality of objects;

counting a number of times that each of the objects is affected by an external event using an event counter of the controller, the event counter including a main counter and a plurality of subcounters respectively corresponding to the plurality of subgroups, a size of each of the subcounters determined based on a first threshold value, a size of the main counter determined based on a second threshold value;

updating a count value of each of the subcounters each time an object in the corresponding subgroup is affected by the external event;

updating a count value of the main counter each time one of the subcounters reaches a count value equal to the first threshold value; and performing system action on the group of objects, when the count value of the main counter is equal to the second threshold value, wherein each of the subcounters operates using a specific range of unused bits of the main counter among multiple non-overlapping ranges of unused bits of the main counter, wherein the controller determines a size of the event counter based on a size of a random access memory (RAM) and a system action threshold value for the system action, and wherein the controller determines the first threshold value based on the size of each of the subcounters.

8. The system of claim 7, wherein each of the objects is affected by the external event.

9. The system of claim 7, wherein the controller determines the second threshold value based on the size of each of the subcounters and a system action threshold value.

10. The system of claim 7, wherein the controller assigns the plurality of objects to different subgroups of the plurality of subgroups for evenly distributing the external event.

11. The system of claim 7, wherein the controller assigns the plurality of objects to different subgroups of the plurality of subgroups to avoid consecutive receipt of the external event by the same subgroup.

12. The system of claim 7, wherein the controller receives the external event for object handling.

13. A non-transitory computer-readable storage medium storing a set of instructions for a controller to perform operations for managing events of an embedded system including a memory system having a memory device with a plurality of groups of objects, the set of instructions comprising instructions for:

dividing a group of objects, among the plurality of groups of objects, into a plurality of subgroups, each subgroup including a plurality of objects;

counting a number of times that each of the objects is affected by an external event using an event counter, the event counter including a main counter and a plurality of subcounters respectively corresponding to the plurality of subgroups, a size of each of the subcounters determined based on a first threshold value, the size of the main counter determined based on a second threshold value;

updating a count value of each of the subcounters each time an object in the corresponding subgroup is affected by the external event;

updating a count value of the main counter each time one of the subcounters reaches a count value equal to the first threshold value; and performing system action on the group of objects, when the count value of the main counter is equal to the second threshold value, wherein each of the subcounters operates using a specific range of unused bits of the main counter among multiple non-overlapping ranges of unused bits of the main counter, wherein a size of the event counter is determined based on a size of a random access memory (RAM) and a relocation threshold value for relocation, and wherein the first threshold value is determined based on the size of each of the subcounters.

* * * * *